United States Patent
Heo et al.

(10) Patent No.: US 12,367,114 B2
(45) Date of Patent: Jul. 22, 2025

(54) STORAGE SYSTEM, STORAGE DEVICE, AND MONITORING METHOD

(71) Applicant: Samsung Electronics Co., Ltd., Suwon-si (KR)

(72) Inventors: Taewook Heo, Suwon-si (KR); Suckhyun Nam, Suwon-si (KR); Ho-Jin Chun, Suwon-si (KR); Minha Kim, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 0 days.

(21) Appl. No.: 18/338,001

(22) Filed: Jun. 20, 2023

(65) Prior Publication Data
US 2024/0220376 A1    Jul. 4, 2024

(30) Foreign Application Priority Data
Dec. 28, 2022    (KR) .................. 10-2022-0187356

(51) Int. Cl.
*G06F 11/14*    (2006.01)
(52) U.S. Cl.
CPC .............................. *G06F 11/1479* (2013.01)
(58) Field of Classification Search
CPC .... G06F 11/1479; G06F 11/3034; G06F 8/71; G06F 9/22; G06F 9/4411; G06F 9/44589; G06F 11/1441; G06F 11/3006; G06F 11/3041; G06F 11/3055
USPC ....................................................... 714/6.11
See application file for complete search history.

(56) References Cited

U.S. PATENT DOCUMENTS

| | | | |
|---|---|---|---|
| 7,594,135 B2 | 9/2009 | Gonzalez et al. | |
| 11,222,698 B2 | 1/2022 | You et al. | |
| 11,249,689 B2 | 2/2022 | Ostrikov et al. | |
| 11,409,606 B2 | 8/2022 | Park et al. | |
| 2017/0220404 A1* | 8/2017 | Polar Seminario | G06F 11/0751 |
| 2021/0096840 A1 | 4/2021 | Kotary et al. | |
| 2021/0218562 A1* | 7/2021 | Grobelny | G06F 21/12 |
| 2022/0179960 A1 | 6/2022 | Spangler | |
| 2023/0027848 A1 | 1/2023 | Hong et al. | |

FOREIGN PATENT DOCUMENTS

| KR | 20140015030 A | 2/2014 |
|---|---|---|
| KR | 20220092973 A | 7/2022 |

* cited by examiner

*Primary Examiner* — Yair Leibovich
(74) *Attorney, Agent, or Firm* — Harness, Dickey & Pierce, P.L.C.

(57) ABSTRACT

Some example embodiments provide a storage device including a non-volatile memory; a microcontroller unit configured to monitor statuses of constituent elements of the storage device and output an abnormality signal based on the constituent elements not being in a normal status; and a storage controller configured to perform a first check and a second check different from the first check on a first firmware code stored in the microcontroller unit in response to the abnormality signal and perform recovery by using a second firmware code stored in the non-volatile memory based on at least one of the first check and the second check having failed.

20 Claims, 7 Drawing Sheets

STORAGE SYSTEM, STORAGE DEVICE, AND MONITORING METHOD

CROSS-REFERENCE TO RELATED APPLICATION

This application claims priority to and the benefit of Korean Patent Application No. 10-2022-0187356 filed in the Korean Intellectual Property Office on Dec. 28, 2022, the entire contents of which are incorporated herein by reference.

BACKGROUND

(a) Field

The present disclosure relate to storage systems, storage devices, and monitoring methods.

(b) Description of the Related Art

A storage device is a device that stores data under control of a host device such as a computer, a smart phone, and a smart pad. The storage device includes a device that stores data on a magnetic disk such as a hard disk drive (HDD), and a device that stores data on a semiconductor memory such as a solid state drive (SSD) and a memory card, particularly a non-volatile memory.

The storage device often includes a microcontroller unit that monitors statuses of constituent elements. However, there is a case in which the microcontroller unit reports an error of a constituent element even though the constituent element is normal, so there is a need to supplement this.

SUMMARY OF THE INVENTION

Some example embodiments are to provide storage systems, storage devices, and monitoring methods that may determine whether a microcontroller unit has failed.

Some example embodiments provide storage systems, storage devices, and monitoring methods that may recover a microcontroller unit.

Some example embodiments provide a storage device including a non-volatile memory; a microcontroller unit configured to monitor statuses of constituent elements of the storage device and output an abnormality signal based on the constituent elements not being in a normal status; and a storage controller configured to perform a first check and a second check different from the first check on a first firmware code stored in the microcontroller unit in response to the abnormality signal and perform recovery by using a second firmware code stored in the non-volatile memory based on at least one of the first check and the second check having failed.

In some example embodiments, the storage controller may be configured to report the abnormality signal to a host based on the first check and the second check being successful.

In some example embodiments, the storage controller may be configured to check a communication status of the microcontroller unit as the first check.

In some example embodiments, the storage controller may be configured to transmit an interrupt request to the microcontroller unit and check the communication status based on a response of the microcontroller unit to the interrupt request.

In some example embodiments, the interrupt request may be a request for version information of an MCU firmware code of the microcontroller unit, and the storage controller may be configured to compare first version information received from the microcontroller unit with second version information stored in the non-volatile memory in response to the interrupt request.

In some example embodiments, the storage controller may be configured to determine that the check of the communication status is successful based on the first version information and the second version information matching, and determine that the check of the communication status has failed based on the first version information and the second version information being different.

In some example embodiments, the storage controller may be configured to check a reset vector of the microcontroller unit as the first check.

In some example embodiments, the storage controller may be configured to request an address of the reset vector from the microcontroller unit, and compare first address received from the microcontroller unit with a second address stored in the non-volatile memory in response to the request.

In some example embodiments, the storage controller may be configured to determine that the check of the reset vector is successful based on the first address and the second address matching, and determine that the check of the reset vector has failed based on the first address and the second address being different.

In some example embodiments, the storage controller may be configured to compare the first firmware code with the second firmware code as the second check.

In some example embodiments, the storage controller may be configured to determine that the second check is successful based on the first firmware code and the second firmware code matching, and determine that the second check has failed based on the first firmware code and the second firmware code being different.

In some example embodiments, the microcontroller unit may be configured to determine that an input voltage of each of the constituent elements is normal based on the input voltage being within a first voltage range.

In some example embodiments, the storage device may further include a power loss protection (PLP) device, wherein the microcontroller unit may be configured to monitor cap health of a capacitor of the PLP device, and determine that the cap health is normal based on the cap health being within a first time range.

In some example embodiments, the microcontroller unit may monitor a remaining time in a sudden power off (SPO) situation, and may determine that the PLP device is normal when the remaining time is longer than or equal to a reference time.

In some example embodiments, the storage controller may be configured to record a recovery count after performing recovery, determine whether the recovery count is less than a reference value based on receiving the abnormality signal from the microcontroller unit, and perform recovery based on the recovery count being less than the reference value.

In some example embodiments, the storage controller may be configured to compare a third firmware code and the second firmware code recorded in the microcontroller unit after the recovery, and instruct the microcontroller unit to stop monitoring based on the second firmware code and the third firmware code being different.

Some example embodiments provide a monitoring method including determining whether there is a failure by checking a code area of a microcontroller unit in response to an abnormality report from the microcontroller unit; performing recovery based on the microcontroller unit being abnormal; and transmitting the abnormality report to a host based on the microcontroller unit being normal.

In some example embodiments, the code area may include a main code syntax, an interrupt syntax, and a reset vector area, and the determining whether there is the failure includes checking at least one of the main code syntax, the interrupt syntax, and the reset vector area.

In some example embodiments, the checking of the at least one includes performing a first check on at least one of the interrupt syntax and the reset vector area; and performing, based on the first check passing, a second check on the main code syntax, the interrupt syntax, and the reset vector area.

Some example embodiments provide a storage controller configured to control a storage device, including a microcontroller unit configured to monitor statuses of constituent elements of the storage device and output an abnormality signal based on the constituent elements not being in a normal status; and a processor configured to perform a first check and a second check different from the first check on a first firmware code stored in the microcontroller unit in response to the abnormality signal and perform recovery based on at least one of the first check and the second check having failed.

DETAILED DESCRIPTION

Figure 1:
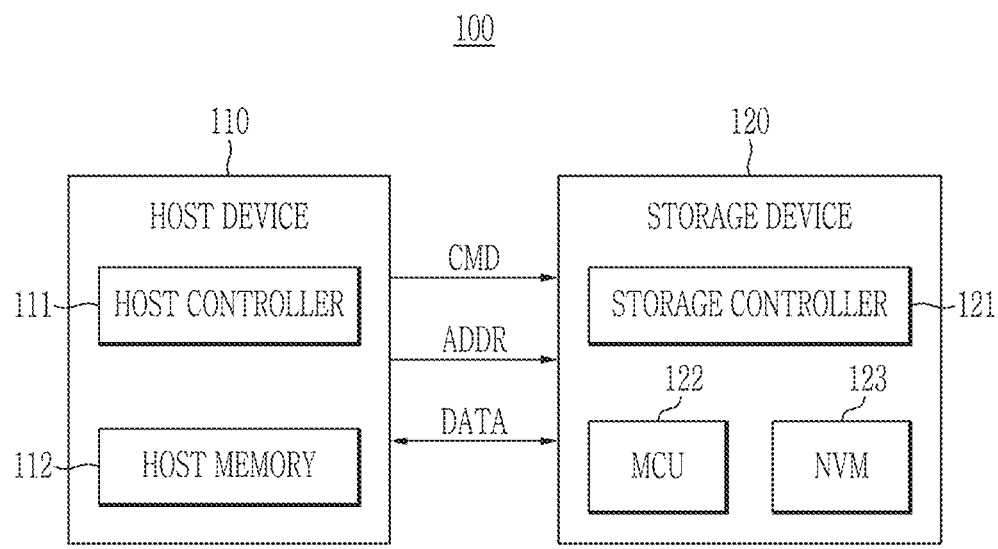
FIG. 1 illustrates a block diagram of a storage system according to some example embodiments.

The present disclosure will be described more fully hereinafter with reference to the accompanying drawings, in which example embodiments of the disclosure are shown. As those skilled in the art would realize, the described example embodiments may be modified in various different ways, all without departing from the spirit or scope of the present disclosure.

Accordingly, the drawings and description are to be regarded as illustrative in nature and not restrictive. Like reference numerals designate like elements throughout the specification. In the flowcharts described with reference to the drawings in this specification, the operation order may be changed, various operations may be merged, certain operations may be divided, and certain operations may not be performed.

In addition, a singular form may be intended to include a plural form as well, unless the explicit expression such as "one" or "single" is used. Terms including ordinal numbers such as first, second, and the like will be used only to describe various constituent elements, and are not to be interpreted as limiting these constituent elements. These terms may be used for a purpose of distinguishing one constituent element from other constituent elements.

FIG. 1 illustrates a block diagram of a storage system according to some example embodiments.

Referring to FIG. 1, a storage system 100 may include a host device 110 and a storage device 120. In some example embodiments, the storage system 100 may be included in user devices such as a personal computer (PC), a laptop computer, a server, a media player, and a digital camera, or in automotive devices such as a navigation device, a black box device, and/or a vehicle electric device. Alternatively, the storage system 100 may be included in a mobile system such as a mobile phone, a smart phone, a tablet personal computer, a wearable device, a healthcare device, and/or an Internet of things (IoT) device.

The host device 110 may control overall operations of the storage system 100. In some example embodiments, the host device 110 may be one of various processors such as a central processing unit (CPU), a graphics processing unit (GPU), a neural processing unit (NPU), and a tensor processing unit (TPU). In some example embodiments, the host device 110 may include a single-core processor or a multi-core processor.

The host device 110 may include a host controller 111 and a host memory 112. The host memory 112 may function as a buffer memory for temporarily storing data DATA to be transmitted to the storage device 120 or data DATA transmitted from the storage device 120.

The host controller 111 may generate a command CMD and provide the command CMD to the storage device 120. The command CMD may include a logical block address ADDR. The host controller 111 may generate a device identification command, a read command, a write command, and the like. The host controller 111 may provide data DATA to be written to the storage device 120 together with a write command.

The host memory 112 may be a dynamic random access memory (DRAM) device, and may have a form factor of a dual in-line memory module (DIMM). However, the present disclosure is not limited thereto, and the host memory 112 may include a non-volatile memory such as a flash memory, a magnetic RAM (MRAM), a phase change RAM (PRAM), or a resistive RAM (ReRAM). For example, the host memory 112 may include one or a combination of a DRAM, a Not-AND (NAND) flash memory, a high bandwidth memory (HBM), a hybrid memory cube (HMC), a DIMM, an optane DIMM, a non-volatile memory DIMM (NVMDIMM), a double data rate synchronous DRAM (DDR SDRAM), and a low-power double data rate synchronous dynamic random access memory (LPDDR SDRAM).

The host device 110 may communicate with the storage device 120 through various interfaces. As an example, the host device 110 may communicate with the storage device 120 through various interfaces such as a universal serial bus (USB), a MultiMediaCard (MMC), a PCI Express (PCI-E), an AT Attachment (ATA), a serial AT Attachment (SATA), a parallel AT Attachment (PATA), a small computer system interface (SCSI), a serial attached SCSI (SAS), an enhanced small disk interface (ESDI), an integrated drive electronics (IDE), and a non-volatile memory express (NVMe).

The storage device 120 is accessed by the host device 110. The storage device 120 may include a storage controller 121, a microcontroller unit (MCU) 122 (or a microcontroller), and a non-volatile memory (NVM) 123. The storage device 120 may store data DATA or process data DATA in response to a command from the host device 110. For example, the storage device 120 may be a solid state drive (SSD), a smart SSD, an embedded multimedia card (eMMC), an embedded universal flash storage (UFS) memory device, a UFS memory card, a compact flash (CF), a secure digital (SD), a micro secure digital (Micro-SD), a mini secure digital (Mini-SD), an extreme Digital (xD), or a memory stick.

The storage controller 121 may control an operation of the storage device 120. For example, the storage controller 121 may control the operation of the non-volatile memory 123 based on a command (CMD) and a logical block address (ADDR) received from the host device 110. The storage controller 121 may control the non-volatile memory 123 to write data (DATA) to the non-volatile memory 123 in response to a write command from the host device 110, or may control the non-volatile memory 123 to read data (DATA) stored in the non-volatile memory 123 in response to a read command from the host device 110.

The microcontroller unit 122 may monitor statuses of constituent elements (for example, the storage controller 121, the non-volatile memory 123, the buffer memory, and the like) of the storage device 120. The microcontroller unit 122 may monitor the constituent elements based on a voltage inputted through a pin. The pin may be a general-purpose input/output (GPIO) pin. The microcontroller unit 122 may perform monitoring by using an analog-digital converter (ADC). For example, the analog-digital converter may be connected to the pin, and the analog-digital converter may convert an analog signal corresponding to each constituent element of the storage device 120 into a digital signal. The microcontroller unit 122 may determine whether a constituent element is abnormal based on a value obtained from the digital signal. For example, the microcontroller unit 122 may determine that the constituent element is normal when the value obtained from the digital signal is within a predetermined (or, alternatively, desired or selected) range, and may determine that the constituent element is abnormal when the value is outside the predetermined (or, alternatively, desired or selected) range. A configuration in which the microcontroller unit 122 performs monitoring will be described later with reference to FIG. 2 to FIG. 4.

The microcontroller unit 122 may provide a monitoring result to the storage controller 121. In some example embodiments, the microcontroller unit 122 may transmit an error report to the storage controller 121 when detecting an abnormal constituent element during monitoring.

The storage controller 121 may receive the monitoring result from the microcontroller unit 122. The storage controller 121 may record the error report in the non-volatile memory 123 in response to the error report of the monitoring result.

In addition, the storage controller 121 may determine whether the microcontroller unit 122 has failed in response to an error report of the monitoring result. For example, the storage controller 121 may determine whether the microcontroller unit 122 has failed by inspecting a communication status, a reset vector, a firmware code, and the like of the microcontroller unit 122.

The storage controller 121 may perform a recovery operation when the microcontroller unit 122 is abnormal (e.g., has a failure). Recovery may be for an MCU firmware code written to the microcontroller unit 122. The storage controller 121 may record the recovery count. The storage controller 121 may update the recovery count when performing recovery. The storage controller 121 may not perform recovery anymore when the recovery count reaches a reference value.

The storage controller 121 may transmit a signal to the host device 110 when the microcontroller unit 122 is normal. A signal may be for notifying that the storage device 120 is abnormal. The host device 110 may instruct the storage device 120 to operate in an error mode in response to the signal from the storage controller 121.

The non-volatile memory 123 may store data (DATA). The data (DATA) may include an MCU firmware code. The MCU firmware code of the non-volatile memory 123 may be used for recovery of microcontroller unit 122. The non-volatile memory 123 may be implemented as at least one memory chip or at least one memory die. For example, each of at least one memory chip may be a dual die package (DDP), a quadruple die package (QDP), or an octuple die package (ODP).

The non-volatile memory 123 may include a memory cell array including non-volatile memory cells capable of maintaining stored data (DATA) even when power of the storage system 100 is blocked, and the memory cell array may be divided into a plurality of memory blocks. The plurality of memory blocks may have a 2D horizontal structure in which memory cells are disposed on the same plane (or layer) in two dimensions or a 3D vertical structure in which non-volatile memory cells are disposed in three dimensions. The memory cell may be a single level cell (SLC) that stores one bit of data (DATA) or a multi-level cell (MLC) that stores two or more bits of data (DATA). However, it is not limited thereto, and each memory cell may be a triple level cell (TLC) that stores 3 bits of data (DATA) or a quadruple level cell (QLC) that stores 4 bits of data (DATA).

The non-volatile memory 123 may include an NAND flash memory. In some example embodiments, the non-volatile memory 123 may include an MRAM, a PRAM, an ReRAM, an electrically erasable programmable read-only memory (EEPROM), a nano floating gate memory (NFGM), a polymer random access memory (PoRAM), a ferroelectric random access memory (FRAM), or a memory similar thereto. Hereinafter, in the present disclosure, it is assumed that the non-volatile memory 123 is a NAND flash memory device.

In some example embodiments, the storage device 120 may further include a buffer memory. The buffer memory may store instruction words and data (DATA) executed and processed by the storage controller 121. The buffer memory may temporarily store data (DATA) stored in the non-volatile memory 123 or to be stored. The buffer memory may buffer the command (CMD), the logical block addresses (ADDR), the data (DATA), and request signals received from the host device 110. The signals buffered in the buffer memory may be transmitted to the non-volatile memory 123. For example, the data (DATA) buffered in the buffer memory may be programmed into the non-volatile memory 123.

The buffer memory may be implemented as a volatile memory such as a DRAM or a static RAM (SRAM). However, it is not limited thereto, and the buffer memory may be implemented as various types of non-volatile memory. The buffer memory may be provided outside the storage controller 121, or the buffer memory may be provided inside the storage controller 121.

Figure 2:
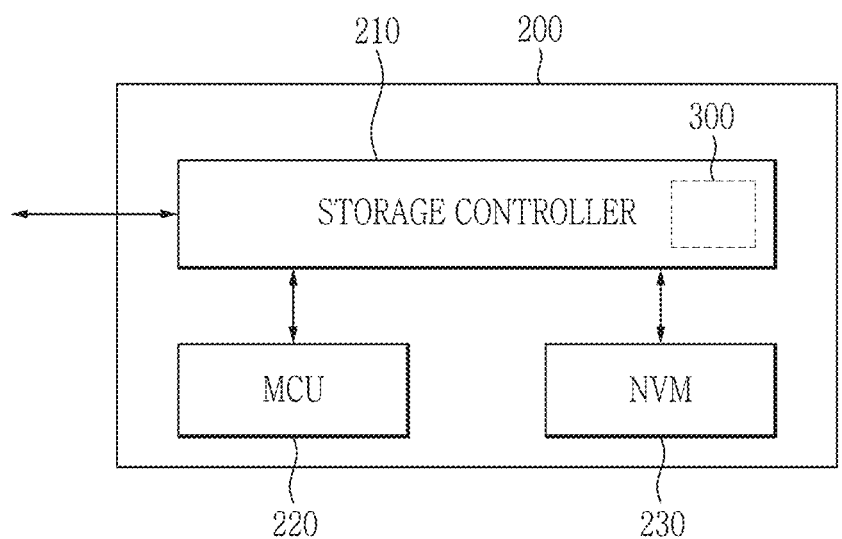
FIG. 2 illustrates a schematic block diagram of a storage device according to some example embodiments.
Figure 3:
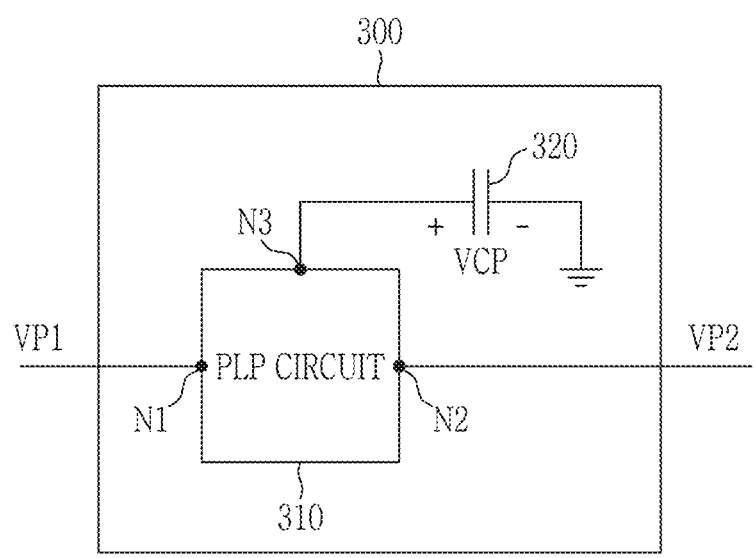
FIG. 3 illustrates a schematic block diagram of a PLP device according to some example embodiments.
Figure 4:
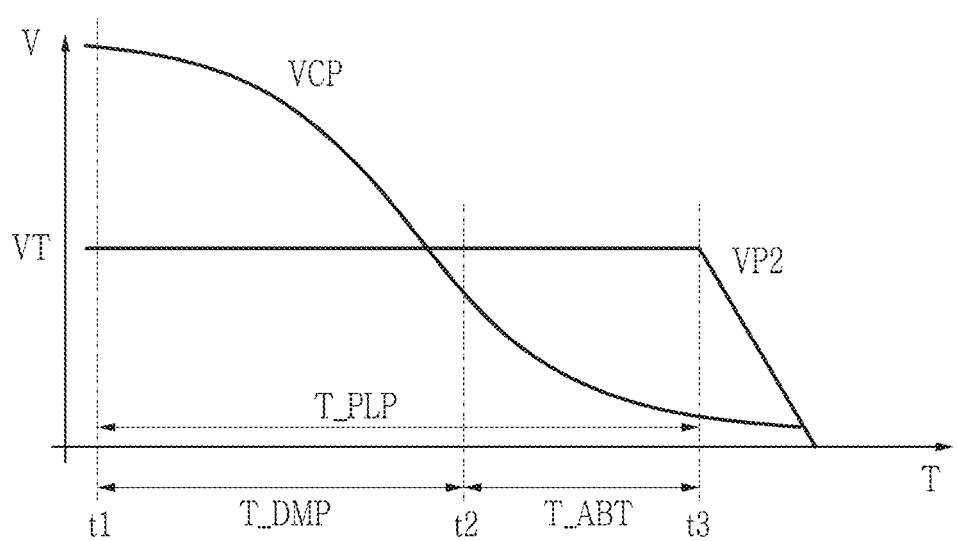
FIG. 4 illustrates a graph for explaining an operation of a PLP device according to some example embodiments.
Figure 5:
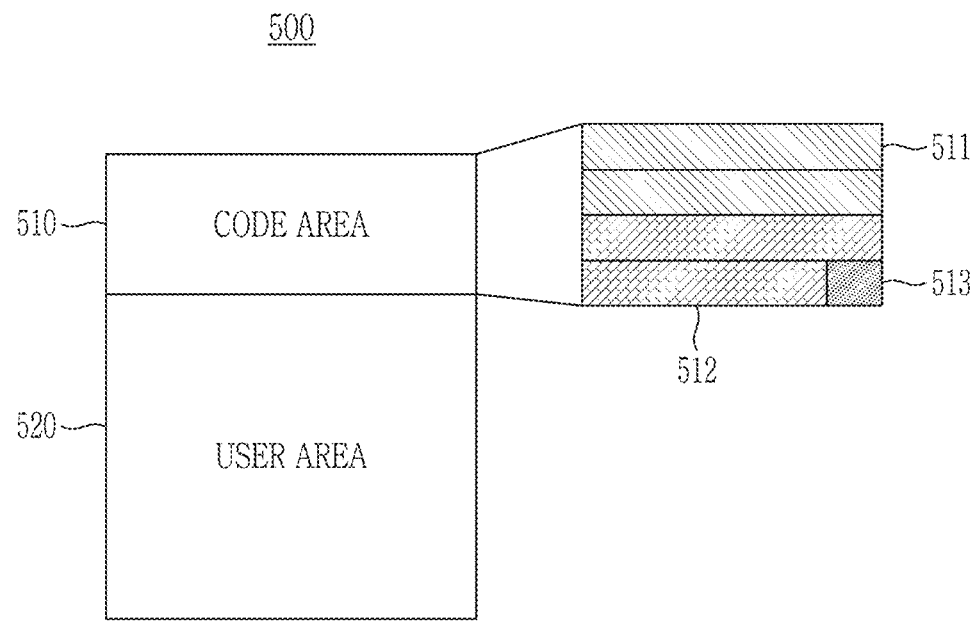
FIG. 5 illustrates a drawing for explaining an inspection area within a microcontroller unit according to some example embodiments.

FIG. 2 illustrates a schematic block diagram of a storage device according to some example embodiments, FIG. 3 illustrates a schematic block diagram of a PLP device according to some example embodiments, FIG. 4 illustrates a graph for explaining an operation of a PLP device according to some example embodiments, and FIG. 5 illustrates a drawing for explaining an inspection area within a microcontroller unit according to some example embodiments.

Referring to FIG. 2, a storage device 200 according to some example embodiments may include a storage controller 210, a microcontroller unit 220, and a non-volatile memory 230.

The storage controller 210 may control an operation of the storage device 200 according to a command from a host. In addition, the storage controller 210 may detect whether or not the storage device 200 is abnormal, and when the storage device 200 is abnormal, it may report it to the host. The storage controller 210 may detect whether the storage device 200 is abnormal according to a monitoring result of the microcontroller unit 220.

The microcontroller unit 220 may monitor statuses of constituent elements of the storage device 200. For example, the statuses of the constituent elements may include a voltage inputted to a constituent element, cap health of a capacitor 320 of a power loss protection (PLP) device 300, a time remaining in sudden power off (SPO) situation, and the like.

The microcontroller unit 220 may perform monitoring by using an analog-digital converter (ADC). For example, the microcontroller unit 220 may monitor input voltages of constituent elements based on a digital signal obtained from an ADC. The microcontroller unit 220 may determine whether the constituent elements are abnormal based on whether the input voltage is out of a predetermined (or, alternatively, desired or selected) voltage range. The microcontroller unit 220 may determine that the input voltage is normal when it is within the predetermined (or, alternatively, desired or selected) voltage range, and the microcontroller unit 220 may determine that the input voltage is abnormal when it is outside the predetermined (or, alternatively, desired or selected) voltage range. The predetermined (or, alternatively, desired or selected) voltage range may include a lower limit value and an upper limit value. That is, the microcontroller unit 220 may determine that constituent elements whose input voltage is less than the lower limit value or exceeds the upper limit value are abnormal. The predetermined (or, alternatively, desired or selected) voltage range for determining the presence or absence of an abnormality may be different for each constituent element.

Referring to FIG. 2 and FIG. 3, the storage controller 210 may include the power loss protection (PLP) device 300. The PLP device 300 may supply power so that the storage device 200 may operate in the SPO situation. For example, the storage device 200 may perform a PLP operation by using the power supplied by the PLP device 300 in the SPO situation. The PLP operation may include a dump operation, an abort operation, and the like. The dump operation may include writing data in the buffer memory of the storage device 200 or the buffer of the non-volatile memory 230 to the memory cell of the non-volatile memory 230 in order to complete the operation according to the command (for example, write command) of the host. In some example embodiments, when an SPO situation occurs during a write operation of the storage device 200, the storage device 200 determines whether or not rewriting is possible, and when the rewriting is possible, the storage device 20 may write less-written data following already-written data to the same memory block. The abort operation may include stopping the operation of the storage device 200 and turning off power. The abort operation may follow the dump operation.

The PLP device 300 may include a PLP circuit 310 and a capacitor 320.

The PLP circuit 310 may receive a voltage VP1 from an external power source, and output a voltage VP2 based on the voltage VP1. The PLP circuit 310 may be configured to stably output the voltage VP2. For example, the PLP circuit 310 may prevent or reduce an overcurrent from flowing. The PLP circuit 310 may remove noise of the voltage VP1. A value of the voltage VP1 and a value of the voltage VP2 may be the same or substantially the same. The PLP circuit 310 may receive the voltage VP1 through a node N1. The PLP circuit 310 may supply the voltage VP2 through a node N2. The PLP circuit 310 may supply the voltage VP2 to constituent elements of the storage device 200, such as the storage controller 210, the microcontroller unit 220, and the non-volatile memory 230. In some example embodiments, the PLP circuit 310 may supply the voltage VP2 to an internal power source, and the internal power source may supply a voltage to constituent elements of the storage device 200 based on the voltage VP2.

The PLP circuit 310 may be connected to the capacitor 320 through a node N3. That is, one end of the capacitor 320 may be connected to the node N3, and the other end thereof may be connected to the ground. The PLP circuit 310 may charge the capacitor 320 with a voltage VCP. A value of the voltage VCP may be larger than the voltage VP1. That is, the PLP circuit 310 may amplify the voltage VP1 to supply it to the capacitor 320.

The PLP circuit 310 may output the voltage VP2 based on voltage VP1 in a normal status. In the SPO situation, the voltage VP1 becomes 0 V, and the PLP circuit 310 may output the voltage VP2 based on the voltage VCP of the capacitor 320. That is, in the SPO situation, the voltage VP2 may be supplied to the constituent elements of the storage device 200 through the discharge of the capacitor 320. In some example embodiments, the capacitor 320 may be implemented as an auxiliary battery. In a normal status, the capacitor 320 may perform charging and discharging in a charging voltage range. The charging voltage range may include a minimum voltage value and a maximum voltage value.

The microcontroller unit 220 may monitor a status of the capacitor 320 (for example, cap health). The cap health may be associated with a discharging time during which the capacitor 320 reaches the minimum voltage value from the maximum voltage value of the charging voltage range in the normal status. The microcontroller unit 220 may monitor the cap health of the capacitor 320 by using an analog-digital converter (ADC). The microcontroller unit 220 may determine that the capacitor 320 is normal when the cap health is within a predetermined (or, alternatively, desired or selected) time range, and may determine that the capacitor 320 is abnormal when the cap health is outside the predetermined (or, alternatively, desired or selected) time range. In some example embodiments, the storage controller 210 or the PLP circuit 310 may monitor the status of the capacitor 320.

FIG. 2 illustrates that the storage controller 210 includes the PLP device 300, but it is not necessarily limited thereto, and in some example embodiments, the PLP device 300 may be implemented as being disposed outside the storage controller 210.

In addition, although one capacitor 320 is illustrated in FIG. 3, it is not necessarily limited thereto, and may be implemented as a capacitance module in which a plurality of capacitors and switches are combined to have a capacitance equivalent to that of the capacitor 320.

The microcontroller unit 220 may monitor the status of the PLP device 300 in the SPO situation. For example, the microcontroller unit 220 may determine a time during which the PLP device 300 may operate in the SPO situation. The microcontroller unit 220 may determine the status of the PLP device 300 based on the time during which the PLP device 300 may operate.

FIG. 4 illustrates an operation of the PLP device 300 when an SPO situation occurs at a time point t1. Referring to FIG. 4, after the time point t1, a change in the voltage VP2 outputted from the PLP circuit 310 and a change in the voltage VCP of the capacitor 320 can be seen.

When the SPO situation occurs at the time point t1, the capacitor 320 supplies power to the PLP circuit 310 by being discharged, and the PLP circuit 310 may output the voltage VP2 based on the power from the capacitor 320.

The PLP circuit 310 may maintain the voltage VP2 to be the same as or substantially the same as a reference voltage VT for a time period T_PLP. A length of the time period T_PLP may be determined based on the amount of charge charged in the capacitor 320. The time period T_PLP may be the same or substantially the same as a sum of a time period T_DMP and a time period T_ABT. The time period T_PLP is a period from the time point t1 to a time point t3, the time period T_DMP is a period from the time point t1 to a time point t2, and the time period T_ABT is a period from the time point t2 to the time point t3. The time period T_PLP may be a PLP operation period, the time period T_DMP may be a dump operation period, and the time period T_ABT, as a remaining time, may be an abort operation period.

The PLP circuit 310 may output the reference voltage VT until the time point t3. When the amount of charge of the capacitor 320 decreases due to discharge, the voltage VP2 outputted from the PLP circuit 310 after the time point t3 may decrease. That is, the PLP circuit 310 may output the voltage VP2 lower than the reference voltage VT. After a predetermined (or, alternatively, desired or selected) time from the time point t3, the PLP circuit 310 may not output a voltage. That is, after the predetermined (or, alternatively, desired or selected) time from the time point t3, the voltage VP2 may be 0 V.

When the SPO situation occurs, the storage device 200 may perform a dump operation and an abort operation. The storage device 200 may perform the dump operation during the time period T_DMP and the abort operation during the time period T_ABT. The dump operation may include writing data in a buffer memory of the storage device 200 or a buffer of the non-volatile memory 230 to a memory cell of the non-volatile memory 230. The abort operation may include stopping the operation of the storage device 200 and turning off power.

The microcontroller unit 220 may determine the status of the PLP device 300 based on the length of the time period T_ABT. The microcontroller unit 220 may determine that the PLP device 300 is abnormal when the length of the time period T_ABT is shorter than the reference time. The microcontroller unit 220 may obtain the length of the time period T_ABT by subtracting the length of the time period T_DMP from the length of the time period T_PLP.

The microcontroller unit 220 may transmit an error report to the storage controller 210 when abnormal constituent elements are detected. For example, the microcontroller unit 220 may transmit an error report to the storage controller 210 when an input voltage of a constituent element is abnormal, when the cap health of the PLP device 300 is abnormal, or when the remaining time is insufficient in the SPO situation.

The storage controller 210 may determine whether the microcontroller unit 220 has failed in response to the error report from the microcontroller unit 220. The storage controller 210 may perform at least one of a first check and a second check on the microcontroller unit 220 to determine whether it has failed. The first check may be a basic check of checking some of code areas of the microcontroller unit 220. The first check may include checking a communication status and a reset vector of the microcontroller unit 220. The second check may be a full check that checks all of the code areas of the microcontroller unit 220. The second check may include checking an MCU firmware code of the microcontroller unit 220.

Referring to FIG. 5, a physical storage area 500 of the microcontroller unit 220 is shown. The microcontroller unit 220 includes a non-volatile memory, and the non-volatile memory may have the storage area 500. The storage area 500 may include a code area 510 and a user area 520. The code area 510 may store an MCU firmware code. The MCU firmware code may include a main code, an interrupt code, and a reset vector. The user area 520 may store monitoring data of the microcontroller unit 220. For example, the user area 520 may record log information about the abnormal constituent element of the storage device 200 detected by the microcontroller unit 220.

The code area 510 may include a main code syntax 511, an interrupt syntax 512, and a reset vector area 513. The main code syntax 511 may include a code for an operation after the power source of the microcontroller unit 220 is turned on. The interrupt syntax 512 may include a code for an operation when an interrupt (for example, an interrupt from the storage controller 210) occurs during an operation of the microcontroller unit 220. The reset vector area 513 may indicate a start position of the main code syntax 511 in an initialization process after the power source of the microcontroller unit 220 is turned on. The microcontroller unit 220 must accurately identify the reset vector area 513 to normally perform the initialization process and monitoring operation. When the microcontroller unit 220 does not accurately identify the reset vector area 513, it may not normally perform the initialization process and monitoring operation.

FIG. 5 schematically shows the main code syntax 511, the interrupt syntax 512, and the reset vector area 513, but this is only an example, and some example embodiments of the present disclosure is not necessarily limited thereto. That is, the positions of the main code syntax 511, the interrupt syntax 512, and the reset vector area 513 may be differently set from those in FIG. 5.

The storage controller 210 may check a communication status of the microcontroller unit 220 as the first check. The storage controller 210 and the microcontroller unit 220 may communicate by using a protocol such as a universal asynchronous receiver/transmitter (UART), an inter-integrated circuit (I2C), or an improved inter-integrated circuit (I3C). The storage controller 210 may check the communication status of the microcontroller unit 220 by checking whether the microcontroller unit 220 normally performs an interrupt operation. For example, the storage controller 210 may determine that the communication status is normal when the microcontroller unit 220 performs an interrupt operation, and determine that the communication status is abnormal when the microcontroller unit 220 fails to perform an interrupt operation.

The storage controller 210 may transmit an interrupt request (IRQ) to the microcontroller unit 220 to check the communication status of the microcontroller unit 220. The microcontroller unit 220 may execute the interrupt syntax 512 in response to the interrupt request (IRQ). The microcontroller unit 220 may transmit a value obtained by executing the interrupt syntax 512 to the storage controller 210 as a response to the IRQ. The storage controller 210 may check whether the microcontroller unit 220 normally performs the interrupt operation based on the response of the microcontroller unit 220.

In some example embodiments, the storage controller 210 may transmit a request for version information of the MCU firmware code to the microcontroller unit 220 as the IRQ. The microcontroller unit 220 may transmit the version information of the MCU firmware code to the storage controller 210 as a response to the IRQ. The storage controller 210 may determine that the communication status of the microcontroller unit 220 is normal when the version information of the MCU firmware code stored in the storage controller 210 and the version information of the MCU firmware code received from the microcontroller unit 220 match. In some example embodiments, the storage controller 210 may itself store the version information of the MCU firmware code, or the non-volatile memory 230 may store the version information of the MCU firmware code. The storage controller 210 may determine that the communication status of the microcontroller unit 220 is abnormal when the version information of the MCU firmware code stored in the storage controller 210 and the version information of the MCU firmware code received from the microcontroller unit 220 are different. In addition, when the microcontroller unit 220 does not transmit the version information of the MCU firmware code to the storage controller 210 (that is, when the storage controller 210 does not receive any information from the microcontroller unit 220), the storage controller 210 may determine that the communication status of the microcontroller unit 220 is abnormal.

The storage controller 210 may check the reset vector of the microcontroller unit 220 as the first check. The storage controller 210 may request an address of the reset vector from the microcontroller unit 220. The microcontroller unit 220 may transmit the address of the reset vector area 513 to the storage controller 210.

The storage controller 210 may determine that the communication status of the microcontroller unit 220 is normal when the address of the reset vector stored in the storage controller 210 and the address of the reset vector area 513 received from the microcontroller unit 220 match. In some example embodiments, the storage controller 210 may itself store the address of the reset vector, or the non-volatile memory 230 may store the address of the reset vector. The storage controller 210 may determine that the communication status of the microcontroller unit 220 is abnormal when the address of the reset vector stored in the storage controller 210 and the address of the reset vector area 513 received from the microcontroller unit 220 are different.

The storage controller 210 may determine that the microcontroller unit 220 has passed the first check when both the communication status and the reset vector of the microcontroller unit 220 are normal. The storage controller 210 may determine that the microcontroller unit 220 has not passed the first check when at least one of the communication status and the reset vector of the microcontroller unit 220 is abnormal.

The storage controller 210 may check all of the code area 510 of the microcontroller unit 220 as the second check. The storage controller 210 may perform the second check when the microcontroller unit 220 passes the first check (a basic check result, the microcontroller unit 220 is normal). The storage controller 210 may compare the MCU firmware code recorded in the code area 510 with the MCU firmware code recorded in the non-volatile memory 230. The storage controller 210 may determine that the second check has been passed when the MCU firmware code recorded in the code area 510 and the MCU firmware code recorded in the non-volatile memory 230 match. The storage controller 210 may determine that the second check has not been passed when the MCU firmware code recorded in the code area 510 and the MCU firmware code recorded in the non-volatile memory 230 are different.

The storage controller 210 may transmit a signal to the host when the microcontroller unit 220 passes the first check and the second check (e.g., based on the basic check and the full check result, the microcontroller unit 220 may be determined to be normal). For example, the storage controller 210 may report to the host that the storage device 200 has an error. The storage controller 210 may report an abnormal constituent element detected by the microcontroller unit 220 as a monitoring result to the host. The host may instruct the storage device 200 to operate in an error mode in response to the error report.

The storage controller 210 may perform a recovery operation on firmware when the microcontroller unit 220 does not pass the first check or the second check (e.g., the microcontroller unit 220 is abnormal). The recovery operation may write the MCU firmware code stored in the non-volatile memory 230 of the storage device 200 to the microcontroller unit 220. That is, the storage controller 210 may erase the existing MCU firmware code of the microcontroller unit 220, and may rewrite the MCU firmware code. For example, using MCU firmware code stored in the storage controller 210 or another location.

The storage controller 210 may compare the MCU firmware code newly recorded in the microcontroller unit 220 as a result of the recovery operation with the MCU firmware code stored in the non-volatile memory 230. The storage controller 210 may instruct the microcontroller unit 220 to continue monitoring when the MCU firmware code of the microcontroller unit 220 and the MCU firmware code of the non-volatile memory 230 match. The storage controller 210 may instruct the microcontroller unit 220 to stop monitoring when the MCU firmware code of the microcontroller unit 220 and the MCU firmware code of the non-volatile memory 230 are different.

The storage controller 210 may record the recovery count. The storage controller 210 may check the recovery count when the microcontroller unit 220 does not pass the first check or the second check. For example, the storage controller 210 may not perform a recovery operation when the recovery count is the same as the reference value. The storage controller 210 may perform a recovery operation when the recovery count is less than the reference value. The storage controller 210 may complete the recovery operation and update the recovery count. The storage controller 210 may increase the recovery count by 1.

The microcontroller unit 220 may be driven by a power source different from that of the storage controller 210. Accordingly, even when the storage controller 210 becomes in the SPO situation to abnormally operates, the microcontroller unit 220 may monitor the constituent elements of the storage device 600. The microcontroller unit 220 may record the monitoring result to the user area 520.

As such, since a condition of the microcontroller unit 220 may be accurately monitored, thus reducing or preventing the microcontroller unit 220 from operating in an abnormal condition. The microcontroller unit 220 operating in an abnormal condition may provide erroneous data about other features of the storage device 200 and thus impact performance of the storage device 200 and associated devices. As such, performance of the storage 200 and associated devices may have improved resource allocation, storage utilization, lifetime effectiveness/monitoring, etc. For example, by monitoring and restoring the microcontroller unit 220, the storage device 200 may have improved performance during an SPO by accurately monitoring the PLP circuit 310 in order to accurately manage data operations during the SPO, as well as improve the general functionality of the storage device 200 by improving resource/processing allocation, reducing, minimizing, or preventing effects of abnormal conditions of monitored features, etc.

Figure 6:
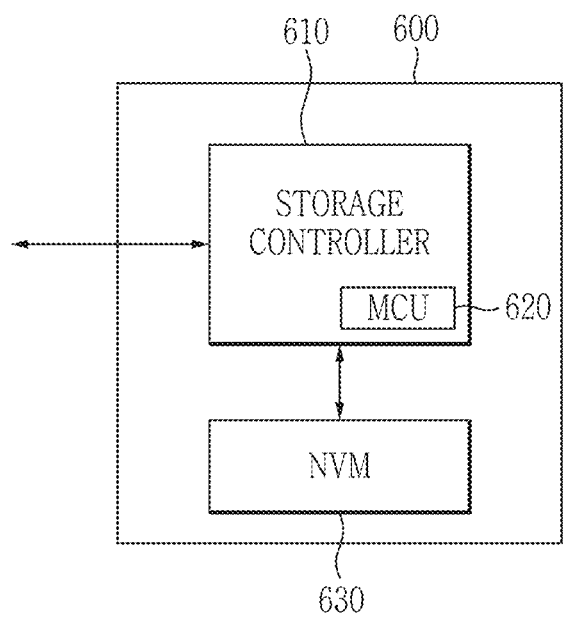
FIG. 6 illustrates a schematic block diagram of a storage device according to some example embodiments.

FIG. 6 illustrates a schematic block diagram of a storage device according to some example embodiments.

Referring to FIG. 6, a storage device 600 according to some example embodiments may include a storage controller 610 and a non-volatile memory 630. The storage controller 610 may include a microcontroller unit 620 that monitors constituent elements of the storage device 600. The microcontroller unit 620 may be driven by a power source different from that of the storage controller 610. Accordingly, even when the storage controller 610 comes, in the SPO situation, to abnormally operate, the microcontroller unit 620 may monitor the constituent elements of the storage device 600. The microcontroller unit 620 may record the monitoring result in a non-volatile memory within the microcontroller unit 620.

Operations of the storage controller 610, the microcontroller unit 620, and the non-volatile memory 630 shown in FIG. 6 may be substantially the same as those of the storage controller 210, the microcontroller unit 220, and the non-volatile memory 230 shown in FIG. 2.

The storage controller 610 may control an operation of the storage device 600 according to a command from a host. In addition, the storage controller 610 may detect whether the storage device 600 is abnormal by using the microcontroller unit 620. The storage controller 610 may report to the host when the storage device 600 is abnormal.

The microcontroller unit 620 may monitor statuses of the constituent elements of the storage device 600. For example, the statuses of the constituent elements may include a voltage inputted to the constituent elements, cap health of a capacitor of a PLP device, a remaining time in an SPO situation, and the like. The microcontroller unit 620 may report to the storage controller 610 when at least one of the constituent elements of the storage device 600 is abnormal.

The storage controller 610 may determine whether the microcontroller unit 620 has failed in response to the report from the microcontroller unit 620. For example, the storage controller 610 may perform at least one of a basic check and a full check on the microcontroller unit 620.

The storage controller 610 may perform a recovery operation when the microcontroller unit 620 has failed. For example, the storage controller 610 may write an MCU firmware code stored in the non-volatile memory 630 to the microcontroller unit 620. When the microcontroller unit 620 is normal, the storage controller 610 may inform the host that a constituent element of the storage device 600 is abnormal.

Figure 7:
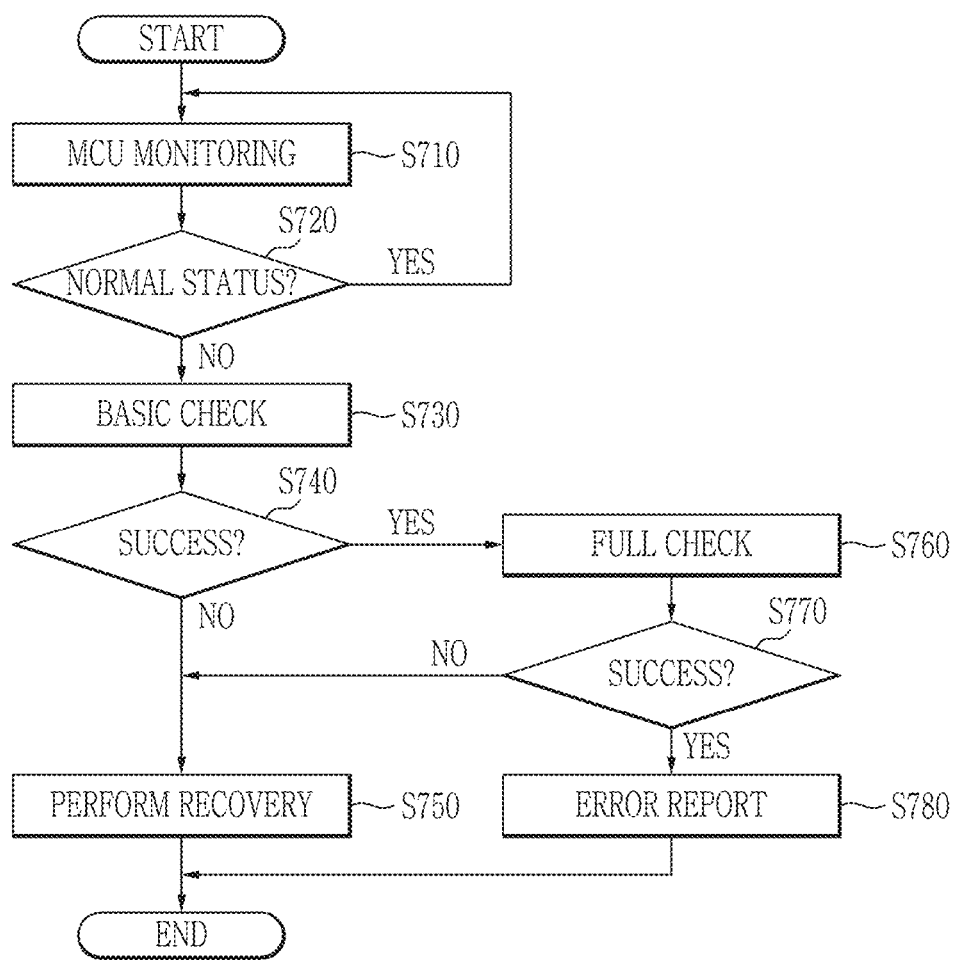
FIG. 7 illustrates a flowchart of a monitoring method of a storage device according to some example embodiments.

FIG. 7 illustrates a flowchart of a monitoring method of a storage device according to some example embodiments.

Referring to FIG. 7, a microcontroller unit (MCU) of a storage device according to some example embodiments may perform monitoring (S710). The microcontroller unit may monitor constituent elements within the storage device. The constituent elements in the storage device may include a storage controller, a PLP device, a capacitor of a PLP device, and a non-volatile memory. For example, the microcontroller unit may monitor the voltage inputted to the constituent element, the cap health of the capacitor of the PLP device, and the remaining time in the SPO situation.

The microcontroller unit may determine whether the constituent elements are in a normal status (S720). The microcontroller unit may determine that the input voltage of the constituent elements is normal when it is within the predetermined (or, alternatively, desired or selected) voltage range, and the microcontroller unit 220 may determine that the input voltage of the constituent elements is abnormal when it is outside the predetermined (or, alternatively, desired or selected) voltage range. The microcontroller unit may determine that the capacitor is normal when the cap health of the capacitor is within a predetermined (or, alternatively, desired or selected) time range, and may determine that the capacitor is abnormal when the cap health is outside the predetermined (or, alternatively, desired or selected) time range. The microcontroller unit may determine that the PLP device is normal when the remaining time in the SPO situation is greater than or equal to the reference time, and may determine that the PLP device is abnormal when the remaining time is less than the reference time.

The microcontroller unit may continuously monitor when the constituent elements are in the normal status. The microcontroller unit may report to the storage controller when at least one constituent element is not in the normal status.

When at least one constituent element is not in the normal status, the storage controller may perform the basic check on the microcontroller unit (S730). The basic check may include a communication status check and a reset vector check. That is, the storage controller may check the communication status and the reset vector of the microcontroller unit.

The storage controller may determine whether the basic check is successful (S740). For example, the storage controller may check the communication status by checking whether the microcontroller unit normally performs an interrupt operation. The storage controller may transmit an interrupt request to the microcontroller unit, and may check the communication status based on the microcontroller unit's response. The storage controller may determine that the communication status is normal when receiving a correct response to the interrupt request. In addition, the storage controller may request an address of the reset vector from the microcontroller unit, and may check whether the microcontroller unit transmits a correct address value. The storage controller may determine that the check of the reset vector is successful when receiving the correct address value of the reset vector.

The storage controller may determine that the basic check has failed when at least one of the communication status check and the reset vector check has failed. The storage controller may determine that the basic check is successful when both the communication status check and the reset vector check are successful.

The storage controller may perform recovery when the basic check has failed (S750). The storage controller may write the MCU firmware code stored in the non-volatile memory of the storage device to the microcontroller unit. In this case, the MCU firmware code previously stored in the microcontroller unit may be erased.

When the basic check is successful, the storage controller may perform the full check on the microcontroller unit (S760). The full check may include a check of the MCU firmware code stored in the code area of the non-volatile memory of the microcontroller unit. The storage controller may compare the MCU firmware code stored in the non-volatile memory of the microcontroller unit with the MCU firmware code stored in the non-volatile memory of the storage device.

The storage controller may determine whether the full check is successful (S770). For example, the storage controller may determine whether the MCU firmware code stored in the non-volatile memory of the microcontroller unit and the MCU firmware code stored in the non-volatile memory of the storage device match. The storage controller may determine that the full check is successful when the MCU firmware codes match, and may determine that the full check has failed when the MCU firmware codes are different.

The storage controller may perform recovery when the full check has failed (S750). The storage controller may write the MCU firmware code stored in the non-volatile memory of the storage device to the microcontroller unit. In this case, the MCU firmware code previously stored in the microcontroller unit may be erased.

When the full check is successful, the storage controller may report the abnormal constituent element reported by the microcontroller unit to the host (S780).

Figure 8:
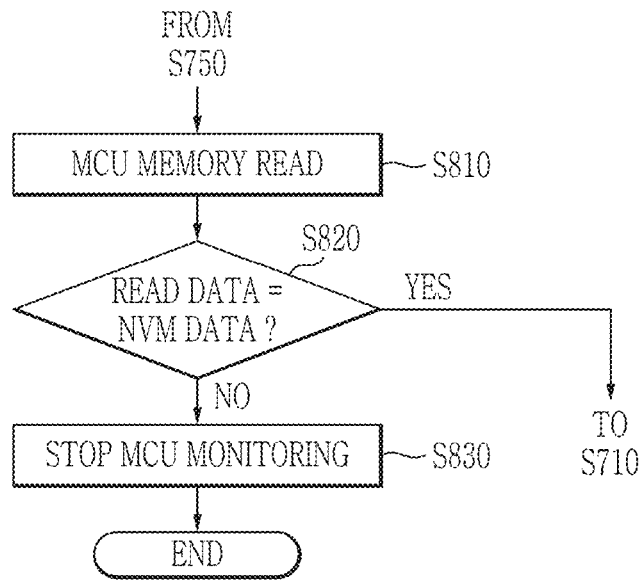
FIG. 8 illustrates a flowchart of a monitoring method of a storage device according to some example embodiments.

FIG. 8 illustrates a flowchart of a monitoring method of the storage device according to some example embodiments.

Referring to FIG. 8, after the storage controller according to some example embodiments performs recovery (S750), the storage controller may read the non-volatile memory of the microcontroller (S810). The storage controller may read the MCU firmware code recorded in the non-volatile memory of the microcontroller.

The storage controller may determine whether the MCU firmware code recorded in the non-volatile memory is the same as the MCU firmware code stored in the non-volatile memory of the storage device (S820).

When the MCU firmware codes are different, the storage controller may instruct the microcontroller unit to stop monitoring (S830).

When the MCU firmware codes are the same, the storage controller may instruct the microcontroller unit to continue monitoring (S710).

Figure 9:
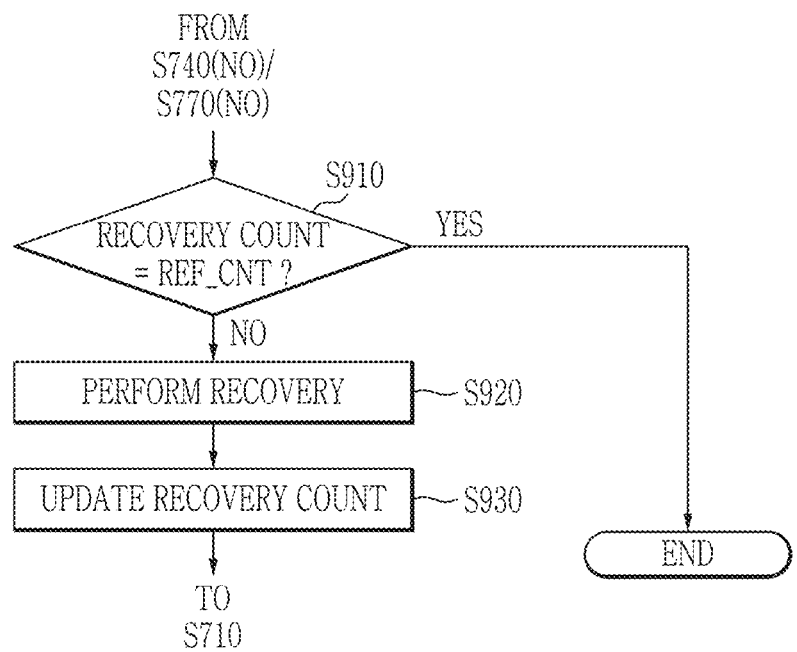
FIG. 9 illustrates a flowchart of a monitoring method of a storage device according to some example embodiments.

FIG. 9 illustrates a flowchart of the monitoring method of the storage device according to some example embodiments.

Referring to FIG. 9, when the storage controller according to some example embodiments fails the basic check (S740: NO) or fails the full check (S770: NO), it may be determined whether the recovery count is the same as a reference value REF_CNT (S910). That is, the storage controller may check the recovery count before performing the recovery operation. The storage controller may not perform the recovery operation when the recovery count is the same as the reference value REF_CNT. The reference value REF_CNT may be a predetermined (or, alternatively, desired or selected) number.

The storage controller may perform the recovery operation when the recovery count is not the same as the reference value REF_CNT (S920). The storage controller may perform the recovery operation by writing the MCU firmware code stored in the non-volatile memory of the storage device to the non-volatile memory of the microcontroller unit. Step S920 may be substantially the same as step S750 shown in FIG. 7.

The storage controller may update the recovery count (S930). The storage controller may increase the recovery count by 1.

Figure 10:
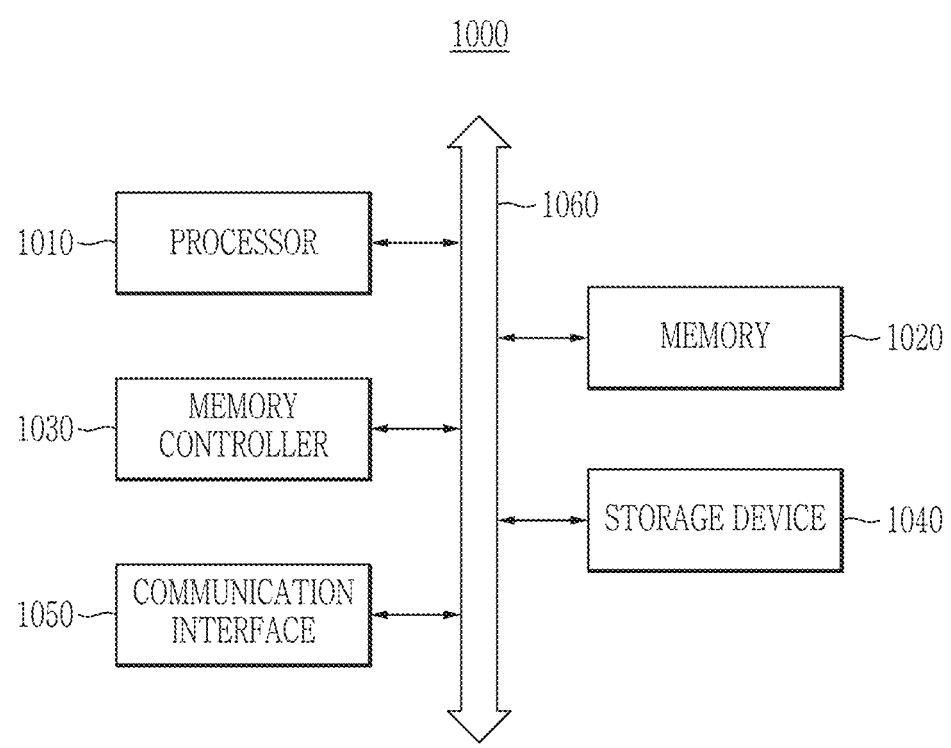
FIG. 10 illustrates a block diagram of a computer system according to some example embodiments.

FIG. 10 illustrates a block diagram of a computer system according to some example embodiments.

Referring to FIG. 10, a computing device 1000 includes a processor 1010, a memory 1020, a memory controller 1030, a storage device 1040, a communication interface 1050, and a bus 1060. The computing device 1000 may further include other general-purpose constituent elements.

The processor 1010 controls an overall operation of each constituent element of the computing device 1000. The processor 1010 may be implemented as at least one of various processing units such as a central processing unit (CPU), an application processor (AP), and a graphics processing unit (GPU).

The memory 1020 stores various data and commands. The memory controller 1030 controls transmission of data or commands to and from the memory 1020. In some example embodiments, the memory controller 1030 may be provided as a separate chip from the processor 1010. In some example embodiments, the memory controller 1030 may be provided as an internal configuration of the processor 1010.

The storage device 1040 non-temporarily stores programs and data. In some example embodiments, the storage device 1040 may be implemented as the storage device described with reference to FIG. 1 to FIG. 9. The communication interface 1050 supports wired and wireless Internet communication of the computing device 1000. In addition, the communication interface 1050 may support various communication methods other than Internet communication. The bus 1060 provides a communication function between constituent elements of the computing device 1000. The bus 1060 may include at least one type of bus according to a communication protocol between the constituent elements.

Figure 11:
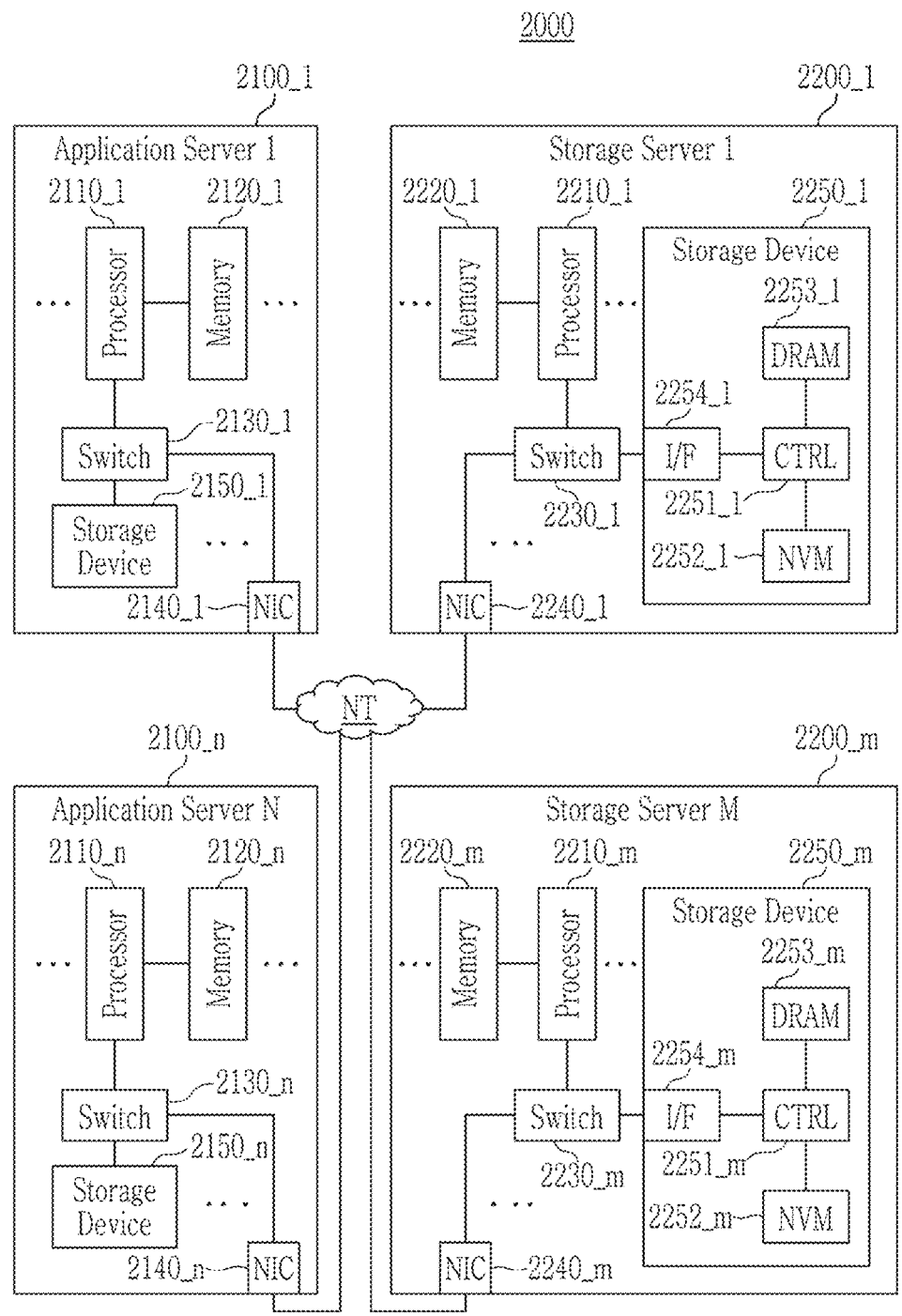
FIG. 11 illustrates a block diagram of a data center to which a storage device according to some example embodiments is applied.

FIG. 11 illustrates a block diagram of a data center to which the storage device according to some example embodiments is applied.

Referring to FIG. 11, a data center 2000 is a facility that maintains and manages various data and provides various services for various data, and may be referred to as a data storage center. The data center 2000 may be a system for operating a search engine or a database, and may be a computing system used in various institutions. The data center 2000 may include a plurality of application servers 2100_1 to 2100_n and a plurality of storage servers 2200_1 to 2200_m. The number of the plurality of application servers 2100_1 to 2100_n and the number of the plurality of storage servers 2200_1 to 2200_m may be variously changed. For example, the value n may be the same as the value m, or the value n may be different from the value m.

Hereinafter, for better understanding and ease of description, an example of the first storage server 2200_1 will be described. Each of the remaining storage servers 2200_2 to 2200_m and each of the plurality of application servers 2100_1 to 2100_n may have a structure similar to that of the first storage server 2200_1.

The first storage server 2200_1 may include a processor 2210_1, a memory 2220_1, a switch 2230_1, a network interface connector (NIC) 2240_1, and a storage device 2250_1. The processor 2210_1 may control the overall operation of the first storage server 2200_1. The memory 2220_1 may store various commands or data under control of the processor 2210_1. The processor 2210_1 may be configured to access the memory 2220_1 to execute various commands or process data. In some example embodiments, the memory 2220_1 may include at least one of various types of memory devices such as a double data rate synchronous DRAM (DDR SDRAM), a high bandwidth memory (HBM), a hybrid memory cube (HMC), a dual in-line memory module (DIMM), an optane DIMM, and a non-volatile DIMM (NVDIMM).

In some example embodiments, the number of the processors 2210_1 and the number of the memories 2220_1 included in the first storage server 2200_1 may be variously changed. In some example embodiments, the processor 2210_1 and the memory 2220_1 included in the first storage server 2200_1 may configure a processor-memory pair, and the number of the processor-memory pairs included in the first storage server 2200_1 may be changed. In some example embodiments, the number of the processors 2210_1 and the number of the memories 2220_1 included in the first storage server 2200_1 may be different from each other. The processor 2210_1 may include a single-core processor or a multi-core processor.

The switch 2230_1 may selectively connect the processor 2210_1 and the storage device 2250_1, or the NIC 2240_1 and the storage device 2250_1, according to the control of the processor 2210_1.

The NIC 2240_1 may be configured to connect the first storage server 2200_1 to a network NT. The NIC 2240_1 may include a network interface card, a network adapter, and the like. The NIC 2240_1 may be connected to the network NT by a wired interface, a wireless interface, a Bluetooth interface, an optical interface, and/or the like. The NIC 2240_1 may include an internal memory, a DSP, a host bus interface, and the like, and may be connected to the processor 2210_1 or the switch 2230_1 through the host bus interface (not shown). The host bus interface may include at least one of various interfaces such as an advanced technology attachment (ATA), a serial ATA (SATA), an external SATA (e-SATA), a small computer small interface (SCSI), a serial attached SCSI (SAS), a peripheral component interconnection (PCI), a PCI Express (PCIe), an NVM express (NVMe), an IEEE 1394, a universal serial bus (USB), a secure digital (SD) card, a multi-media card (MMC), an embedded multi-media card (eMMC), a universal flash storage (UFS), an embedded universal flash storage (eUFS), and a compact flash (CF) card. In some example embodiments, the NIC 2240_1 may be integrated with at least one of the processor 2210_1, the switch 2230_1, and the storage device 2250_1.

The storage device 2250_1 may store data or output the stored data, under the control of the processor 2210_1. The storage device 2250_1 may include a controller 2251_1, a non-volatile memory 2252_1, a DRAM 2253_1, and an interface 2254_1. In some example embodiments, the storage device 2250_1 may further include a secure element (SE) for security or privacy.

The controller 2251_1 may control overall operations of the storage device 2250_1. In some example embodiments, the controller 2251_1 may include an SRAM. The controller 2251_1 may store data in the non-volatile memory 2252_1 or output the data stored in the non-volatile memory 2252_1, in response to signals received through the interface 2254_1. In some example embodiments, the controller 2251_1 may be configured to control the non-volatile memory 2252_1 based on a toggle interface or an ONFI interface.

The DRAM 2253_1 may be configured to temporarily store data to be stored in the non-volatile memory 2252_1 or data read from the non-volatile memory 2252_1. The DRAM 2253_1 may be configured to store various data (for example, meta data, mapping data, etc.) required for the controller 2251_1 to operate. The interface 2254_1 may provide a physical connection between the processor 2210_1, the switch 2230_1, the NIC 2240_1, and the controller 2251_1. In some example embodiments, the interface 2254_1 may be implemented in a direct attached storage (DAS) method that directly connects the storage device 2250_1 with a dedicated cable. In some example embodiments, the interface 2254_1 may be configured based on at least one of the various interfaces through the host interface bus described above.

The configurations of the above-described first storage server 2200_1 are examples, and the scope of the present disclosure is not limited thereto. The above-described configurations of the first storage server 2200_1 may be applied to other storage servers or a plurality of application servers, respectively. In some example embodiments, in each of the plurality of application servers 2100_1 to 2100_n, the storage device 2150_1 may be selectively omitted.

The plurality of application servers 2100_1 to 2100_n and the plurality of storage servers 2200_1 to 2200_m may communicate with each other through the network NT. The network NT may be implemented by using a fiber channel (FC) or Ethernet. In this case, the FC is a medium used for relatively high-speed data transmission, and may use an optical switch that provides high performance/high availability. Depending on an access method of the network NT, the storage servers 2200_1 to 2200_m may be provided as a file storage, a block storage, and/or an object storage.

In some example embodiments, the network NT may be a storage-only network, such as a storage area network (SAN). For example, the SAN may be an FC-SAN that uses an FC network and is implemented according to FC protocol (FCP). Alternatively, the SAN may be an IP-SAN that uses a TCP/IP network and is implemented according to an iSCSI (SCSI over TCP/IP or Internet SCSI) protocol. In some example embodiments, the network NT may be a general network such as a TCP/IP network. For example, the network NT may be implemented according to a protocol such as FC over Ethernet (FCOE), Network Attached Storage (NAS), and NVMe over Fabrics (NVMe-oF).

In some example embodiments, at least one of the plurality of application servers 2100_1 to 2100_n may be configured to access at least another one of the plurality of application servers 2100_1 to 2100_n or at least one of the plurality of storage servers 2200_1 to 2200_m.

For example, the first application server 2100_1 may store data requested by a user or a client in at least one of the plurality of storage servers 2200_1 to 2200_m through the network NT. Alternatively, the first application server 2100_1 may obtain data requested by a user or a client from at least one of a plurality of storage servers 2200_1-2200_m through the network NT. In this case, the first application server 2100_1 may be implemented as a web server or a database management system (DBMS).

That is, the processor 2110_1 of the first application server 2100_1 may access the memory 2120_n or the storage device 2150_n of another application server 2100_n through the network NT. Alternatively, the processor 2110_1 of the first application server 2100_1 may access the memory 2220_1 or the storage device 2250_1 of the first storage server 2200_1 through the network NT. Through this, the first application server 2100_1 may perform various operations on data stored in other application servers 2100_2 to 2100_n and/or the plurality of storage servers 2200_1 to 2200_m. For example, the first application server 2100_1 may execute or issue a command for moving or copying data between other application servers 2100_2 to 2100_n or the plurality of storage servers 2200_1 to 2200_m. In this case, the moved or copied data may be moved from the storage devices 2250_1 to 2250_m of the storage servers 2200_1 to 2200_m through the memories 2220_1 to 2220_m of the storage servers 2200_1 to 2200_m to the memories 2120_1 to 2120_n of the application servers 2100_1 to 2100_n, or may be directly moved therefrom to the memories 2120_1 to 2120_n of the application servers 2100_1 to 2100_n. Data transmitted through the network NT may be encrypted data for security or privacy.

In some example embodiments, the above-described storage servers 2200_1 to 2200_m or the above-described storage devices 2150_1 to 2150_n and 2250_1 to 2250_m may include the microcontroller unit according to some example embodiments of the present disclosure. That is, at least one of the storage servers 2200_1 to 2200_m or the storage devices 2150_1 to 2150_n and 2250_1 to 2250_m may monitor the constituent elements of the storage device by using the microcontroller unit described with reference to FIG. 1 to FIG. 10, may determine whether the microcontroller unit has failed, and may perform the recovery operation on the microcontroller unit or may report the error of the constituent element to the host according to whether the microcontroller unit has failed.

In some example embodiments, each constituent element or a combination of two or more constituent elements described with reference to FIG. 1 to FIG. 11 may be implemented as a digital circuit, a programmable or non-programmable logic device or array, an application specific integrated circuit (ASIC), and/or the like.

When the terms "about" or "substantially" are used in this specification in connection with a numerical value, it is intended that the associated numerical value includes a manufacturing or operational tolerance (e.g., +10%) around the stated numerical value. Moreover, when the words "generally" and "substantially" are used in connection with geometric shapes, it is intended that precision of the geometric shape is not required but that latitude for the shape is within the scope of the disclosure. Further, regardless of whether numerical values or shapes are modified as "about" or "substantially," it will be understood that these values and shapes should be construed as including a manufacturing or operational tolerance (e.g., ±10%) around the stated numerical values or shapes.

As described herein, any electronic devices and/or portions thereof according to any of the example embodiments may include, may be included in, and/or may be implemented by one or more instances of processing circuitry such as hardware including logic circuits; a hardware/software combination such as a processor executing software; or any combination thereof. For example, the processing circuitry more specifically may include, but is not limited to, a central processing unit (CPU), an arithmetic logic unit (ALU), a graphics processing unit (GPU), an application processor (AP), a digital signal processor (DSP), a microcomputer, a field programmable gate array (FPGA), and programmable logic unit, a microprocessor, application-specific integrated circuit (ASIC), a neural network processing unit (NPU), an Electronic Control Unit (ECU), an Image Signal Processor (ISP), and the like. In some example embodiments, the processing circuitry may include a non-transitory computer readable storage device (e.g., a memory), for example a DRAM device, storing a program of instructions, and a processor (e.g., CPU) configured to execute the program of instructions to implement the functionality and/or methods performed by some or all of any devices, systems, modules, units, controllers, circuits, architectures, and/or portions thereof according to any of the example embodiments, and/or any portions thereof.

While this disclosure has been described in connection with what is presently considered to be some practical, example, embodiments, it is to be understood that the disclosure is not limited to the disclosed example embodiments, but, on the contrary, is intended to cover various modifications and equivalent arrangements included within the spirit and scope of the appended claims.

What is claimed is:

1. A storage device comprising:
   a non-volatile memory;
   a microcontroller unit configured to
   monitor statuses of constituent elements of the storage device, and
   output an abnormality signal based on the constituent elements not being in a normal status; and
   a storage controller configured to
   perform a first check and a second check, a check type of the second check being different from a check type of the first check, on a first firmware code stored in the microcontroller unit in response to the abnormality signal, and
   perform recovery by using a second firmware code stored in the non-volatile memory based on at least one of the first check and the second check having failed.

2. The storage device of claim 1, wherein
the storage controller is configured to report the abnormality signal to a host based on the first check and the second check being successful.

3. The storage device of claim 1, wherein
the storage controller is configured to check a communication status of the microcontroller unit as the first check.

4. The storage device of claim 3, wherein
the storage controller is configured to transmit an interrupt request to the microcontroller unit and check the communication status based on a response of the microcontroller unit to the interrupt request.

5. The storage device of claim 4, wherein
the interrupt request is a request for version information of an MCU firmware code of the microcontroller unit, and
the storage controller is configured to compare first version information received from the microcontroller unit with second version information stored in the non-volatile memory in response to the interrupt request.

6. The storage device of claim 5, wherein
the storage controller is configured to determine that the check of the communication status is successful based on the first version information and the second version information matching and determine that the check of the communication status has failed based on the first version information and the second version information being different.

7. The storage device of claim 1, wherein the storage controller is configured to check a reset vector of the microcontroller unit as the first check.

8. The storage device of claim 7, wherein the storage controller is configured to request an address of the reset vector from the microcontroller unit and compare a first address received from the microcontroller unit with a second address stored in the non-volatile memory in response to the request.

9. The storage device of claim 8, wherein the storage controller is configured to determine that the check of the reset vector is successful based on the first address and the second address matching and determine that the check of the reset vector has failed based on the first address and the second address being different.

10. The storage device of claim 1, wherein the storage controller is configured to compare the first firmware code with the second firmware code as the second check.

11. The storage device of claim 10, wherein the storage controller is configured to determine that the second check is successful based on the first firmware code and the second firmware code matching and determine that the second check has failed based on the first firmware code and the second firmware code being different.

12. The storage device of claim 1, wherein the microcontroller unit is configured to determine that an input voltage of each of the constituent elements is normal based on the input voltage being within a first voltage range.

13. The storage device of claim 1, further comprising a power loss protection (PLP) device, wherein the microcontroller unit is configured to monitor cap health of a capacitor of the PLP device, and determine that the cap health is normal based on the cap health being within a first time range.

14. The storage device of claim 13, wherein the microcontroller unit is configured to monitor a remaining time in a sudden power off (SPO) situation, and determine that the PLP device is normal based on the remaining time being longer than or equal to a reference time.

15. The storage device of claim 1, wherein the storage controller is configured to record a recovery count after performing recovery, determine whether the recovery count is less than a reference value based on receiving the abnormality signal from the microcontroller unit, and perform recovery based on the recovery count being less than the reference value.

16. The storage device of claim 1, wherein the storage controller is configured to compare a third firmware code and the second firmware code recorded in the microcontroller unit after the recovery, and instruct the microcontroller unit to stop monitoring based on the second firmware code and the third firmware code being different.

17. A monitoring method comprising:
selecting at least one code area from code areas based on an abnormality report from a microcontroller unit, the code areas including a main code syntax code area, an interrupt syntax code area, and a reset vector code area;
determining whether there is a failure by checking the selected at least one code area of the microcontroller unit in response to the abnormality report from the microcontroller unit;
performing recovery based on the microcontroller unit being abnormal; and
transmitting the abnormality report to a host based on the microcontroller unit being normal.

18. The monitoring method of claim 17, wherein the determining whether there is the failure includes checking at least one of the main code syntax code area, the interrupt syntax code area, and the reset vector code area.

19. The monitoring method of claim 18, wherein the checking of the at least one includes:
performing a first check on at least one of the interrupt syntax code area or the reset vector code area; and
performing, based on the first check passing, a second check on the main code syntax code area, the interrupt syntax code area, and the reset vector code area.

20. A storage controller controlling a storage device, comprising:
a microcontroller unit configured to monitor statuses of constituent elements of the storage device and output an abnormality signal based on the constituent elements not being in a normal status; and
a processor configured to perform a first check and a second check, a check type of the second check being different from a check type of the first check, on a first firmware code stored in the microcontroller unit in response to the abnormality signal and performs recovery based on at least one of the first check and the second check having failed.

* * * * *